United States Patent [19]
Cross

[11] Patent Number: 5,602,878
[45] Date of Patent: Feb. 11, 1997

[54] METHOD OF DELIVERING STABLE DATA ACROSS AN ASYNCHRONOUS INTERFACE

[75] Inventor: Leonard W. Cross, Portland, Oreg.

[73] Assignee: Intel Corporation, Santa Clara, Calif.

[21] Appl. No.: 311,679

[22] Filed: Sep. 23, 1994

[51] Int. Cl.$^6$ .................................................... H04L 7/00
[52] U.S. Cl. .................... 375/354; 375/220; 375/357; 375/377; 395/309; 370/298; 370/503
[58] Field of Search .................................. 375/220, 354, 375/356, 357, 362, 370, 371, 377; 370/91, 100.1, 103, 105.3, 41, 85.11; 395/200.01, 200.02, 200.05, 200.14, 200.19, 200.2, 285, 286, 309; 327/141, 144, 154, 162

[56] References Cited

U.S. PATENT DOCUMENTS

| | | | |
|---|---|---|---|
| 5,115,455 | 5/1992 | Samaras et al. | 375/354 |
| 5,138,189 | 8/1992 | Leung et al. | 327/198 |
| 5,291,529 | 3/1994 | Crook et al. | 375/358 |
| 5,339,395 | 8/1994 | Pickett et al. | 370/91 |
| 5,359,630 | 10/1994 | Wade et al. | 375/354 |

Primary Examiner—Stephen Chin
Assistant Examiner—Amanda T. Le
Attorney, Agent, or Firm—Blakely, Sokoloff, Taylor, and Zafman

[57] ABSTRACT

The present invention relates to a method and apparatus for asynchronously transferring data from a first synchronous sequential logic circuit which derives its clock source from a first clock to a second synchronous sequential logic circuit which derives its clock source from a second clock, whereby metastability of the second synchronous sequential logic circuit is avoided. The invention comprises a data path and a control path; a data synchronizer coupled to the data path for synchronizing data signals; a control synchronizer coupled to the control path for synchronizing control signals; a register coupled in parallel to the data path for storing valid data output from the data synchronizer; a multiplexor having one input coupled to the data path, another input coupled to the register, a selector input coupled to the control path for selecting between receiving as input synchronized data signals or the contents of the register, and an output for transmitting valid data. If metastability is unlikely, the control signal is deasserted causing the multiplexor to select the synchronized data as input. If metastability is likely, the synchronized control signal is asserted causing the multiplexor to select the register as input. The basic test is whether to accept the new state of the data signal or wait and use the old state currently maintained in the register, until such time as the likelihood of metastability has passed, as indicated by the synchronized control signal.

8 Claims, 4 Drawing Sheets

METHOD OF DELIVERING STABLE DATA ACROSS AN ASYNCHRONOUS INTERFACE

BACKGROUND OF THE INVENTION

1. Field of the Invention

The present invention relates to the field of sequential digital logic design. Specifically, the present invention relates to a method and apparatus for asynchronously transferring data from a first synchronous sequential logic circuit which derives its clock source from a first clock to a second synchronous sequential logic circuit which derives its clock source from a second clock, whereby metastability of the second synchronous sequential logic circuit is avoided.

2. Description of Related Art

Components of digital logic circuits are characterized as either combinational or sequential. Combinational logic circuits are comprised of logic gates that, generally, perform the logical operations of Boolean AND, OR and NOT. The output of such a gate is dependent only upon its inputs. By contrast, sequential logic circuits are comprised of memory elements, such as flip-flops or registers, that maintain state information, that is, that store a value, and combinational logic. The output of such a memory element is a function of not only its inputs, but of the contents, or present state, of the memory element as well.

Sequential logic circuits are further characterized as either asynchronous (unclocked) or synchronous (clocked). Whereas inputs to an asynchronous sequential logic circuit can change at any time, and thus, the state of the circuit is capable of changing at any time, the inputs to a synchronous logic circuit are capable of changing the state, and thus, the output of the circuit, only at specific times, as defined by a particular clocking or timing methodology.

As is well known to those of ordinary skill in the art of digital logic circuit design, clocked or synchronous sequential circuits are triggered, that is, they change state, according to clock pulses input to the circuit. As the output of a memory element is a signal representing the current state of the memory element, it follows that the output of a clocked sequential circuit is updated in synchronization with clock pulses provided as input to the circuit.

A common timing methodology in the art is edge-triggered clocking, wherein a memory element is triggered, i.e., the one or more inputs to the memory element are sampled, during either the leading (rising) or trailing (falling) edge of a clock signal supplied as input to the memory element. Thus, for example, a trailing edge triggered flip-flop changes state on the trailing edge of a clock signal in transition and maintains that state for one complete clock cycle, that is, until another trailing edge of a clock signal is detected. In the event a flip-flop is required to change state with less frequency than every clock cycle, for example, when propagational delay of a signal through combinational logic coupled between a first and second flip-flop exceeds the time to complete one clock cycle, a control signal provided as input to the second flip-flop may further control at which trailing edge of a clock signal it may change state, so that it is capable of changing state only after the signal output from the first flip-flop has arrived at one of its inputs.

When a memory element such as a flip-flop or register is triggered by the edge of a clock signal, inputs to the memory element should be stable at that time. If one or more inputs to a memory element are changing state at the time at which a clock edge is received (and the inputs sampled), the state and, thus, the output of the memory element may be unstable. When one or more inputs of a memory element are in transition at the time the memory element is triggered, thereby causing the state and output to be indeterminate, the memory element is said to be in a metastable state.

To avoid metastability, there are fundamental timing requirements which digital logic circuit designers should give consideration. One such timing requirement is setup time, hereinafter referred to as $T_{setup}$, which defines that period of time immediately prior to receiving a clock edge in which inputs to the memory element must be stable and valid, either high or low. Likewise, another fundamental timing requirement, hold time, hereinafter referred to as $T_{hold}$, defines that period of time immediately following reception of a clock edge in which inputs to the memory element must be stable and valid. Metastability is the resulting behavior of a synchronous memory element if such fundamental timing requirements are not met. Thus, each input to a synchronous memory element must be stable, that is, maintain a voltage level representing a valid logic value so that a single valid output logic value is detected, for a window of time equal to $T_{setup}+T_{hold}$ so as to avoid metastability. It should be further noted, as is well known to those of ordinary skill in the art, metastability can manifest itself in many ways, including, but not limited to, an unpredictable output logic value, oscillation of the output value, indeterminate voltage level of the output representing a illegitimate logic value somewhere between a valid high or valid low logic value, and an indeterminate period of instability.

When coupling two external devices together, such as a digital computer and an input/output device, it may not be possible or advantageous for all the logic circuitry involved to derive its clock source from the same clock. In such a case, a plurality of clocks, each providing a clock signal to an exclusive region of the logic circuitry of a device, or each providing a clock signal to the logic circuitry of separate, external, devices may be employed. Thus, in such circumstances, multiple clock domains may exist. Components of a synchronous logic circuit which derive their clock source from the same clock are in the same clock domain. In contrast, components of synchronous logic circuits, or synchronous logic circuits, which derive their clock source from different, independent clocks are in different clock domains.

Signals transferred between a first synchronous logic circuit in a first clock domain and a second synchronous logic circuit in a second clock domains are transferred asynchronously. The problem inherent in such a transfer is that a signal transferred from the first synchronous logic circuit may be in transition at the same time a clock signal for the second synchronous logic circuit triggers the memory element receiving as input the signal from the first synchronous logic circuit, thereby inducing metastability. In the prior art, to prevent an asynchronous signal arriving at the second logic circuit from being in transition during triggering of the second logic circuit, the first and second circuits use control signals in the form of a two-way handshake to synchronize the asynchronously transferred signal.

Referring to FIG. 1, an example of the logic needed to implement the prior art, two-way handshake method of asynchronous transfer between a first synchronous logic circuit and a second synchronous logic circuit is shown. Circuit 100 is comprised of two separate, synchronous sequential logic circuits, each having their own clock, namely, the logic circuit in source clock domain 101 and the logic circuit in destination clock domain 102. The circuit in source clock domain 101 is comprised of source register 103 and source control logic 105, which in turn, comprises a finite state machine and two flip-flops, 107a and 107b, hereinafter collectively referred to as synchronizer chain 107. The circuit in destination clock domain 102 is comprised of destination register 104, and destination control logic 106, which in turn, comprises a finite state machine and two flip-flops, 108a and 108b, hereinafter collectively referred to as synchronizer chain 108. In this example, data is transferred from source register 103 to destination register 104. Source control logic 105 and destination control logic 106 control the sequence of operations and synchronize the handshake signals DATA_GNT 113 and DATA_ACK 114 by way of synchronizer chain 107 and synchronizer chain 108, respectively. In this way, source control logic 105 and destination control logic 106 cooperate to asynchronously transfer data from the logic circuit of source clock domain 101, specifically, source register 103, to the logic circuit of destination clock domain 102, specifically, destination register 104.

A synchronizer chain is commonly constructed of a plurality of flip-flops coupled in sequence, wherein each flip-flop may be referred to as a stage in the synchronization chain. For example, synchronizer chain 107 in the prior art shown in FIG. 1 is comprised of two flip-flops in sequence, the output of flip-flop 107a coupled to the input of flip-flop 107b. It should be noted that although in this example the synchronization chain has a depth of two, that is, two flip-flops coupled in sequence, a synchronization chain can be of any depth. The effectiveness of a given synchronization stage is directly related to how quickly a flip-flop at that stage can resolve metastability, which, generally, is a function of the propagational delay of the flip-flop, and how long the flip-flop has to resolve the metastability before the following stage samples its output, that is, the frequency of operation. Generally, as the number of flip-flops chained together increases, the probability that the output of the final flip-flop is metastable decreases significantly. However, since metastability may have occurred earlier in the synchronization chain, the logical value output at the end of the synchronization chain may not reflect the original state of the signal input to the synchronization chain. Thus, while the occurrence of metastability may be minimized through the use of a synchronization chain, the accuracy of the logical value of the signal, in this example, a control signal, output from the chain is still suspect.

Because destination register 104 by itself does not know when source register 103 has data available for transfer over line 112, it is necessary that a control signal furnish this information. When asserted, the data grant (DATA_GNT 113) signal sent by source control logic 105 informs destination control logic 106 when source register 103 has data available and is ready to transmit. Moreover, since source control logic 105 should be informed when data has been accepted by destination register 104, it is necessary that a control signal furnish this information. The data acknowledge (DATA_ACK 114) signal sent by destination control logic 106, when asserted, informs source control 105 that destination register 104 has received the data from source register 103 by way of line 112. Source control logic 105 assures that the contents of source register 103 do not change after DATA_GNT 113 is asserted until it detects the assertion of DATA_ACK 114.

A significant amount of delay is incurred to complete a two-way handshake using control signals DATA_GNT 113 and DATA_ACK 114 due to the time required for flip-flops 108a and 108b to synchronize DATA_GNT 113 and flip-flops 107a and 107b to synchronize DATA_ACK 114. Referring now to FIG. 2, waveform 201 represents the clock signal for the circuitry in source clock domain 101, whereas waveform 205 represents the clock signal for the circuitry in destination clock domain 102. Waveform 202 represents the asynchronous data grant signal DATA_GNT 113 sent by source control logic 105 when source register 103 has new data available to transmit over line 112. The presence of valid data in waveform 204 beginning at time 212 coincides with the assertion of the data grant signal DATA_GNT 113. The data grant signal DATA_GNT 113 can arrive at destination control logic 106 in destination clock domain 102 at any time, thus, synchronizer 108 synchronizes the signal, producing as output a synchronized data grant signal represented by waveform 206. The delay incurred to synchronize the data grant signal DATA_GNT 113 is shown at 208. Upon receiving the synchronized data grant signal 206 via line 116 (FIG. 1), destination register 104 begins receiving valid data present on line 112.

Waveform 207 represents the asynchronous data acknowledge signal DATA_ACK 114 sent by destination control logic 106 when destination register 104 has received valid data from source control register 104 by way of line 112. The data acknowledge signal DATA_ACK 114 can arrive at source control logic 105 in source clock domain 101 at any time, thus, synchronizer 107 synchronizes the signal, producing as output a synchronized data acknowledge signal represented by waveform 203. The delay incurred to synchronize the data acknowledge signal DATA_ACK 114 is shown at 209. Upon receiving the synchronized data acknowledge signal 203 via line 115 (FIG. 1), the contents of source register 103 can thereafter change value as shown at time 213. However, until the handshake is complete at time 214, new data in source register 103 is not available for transmission over line 112. Thus, the method of asynchronously transferring data using two-way handshake control signals limits the rate at which data can be transferred between synchronous logic circuits having different clock domains. While logic capable of buffering data could be employed, the logic is difficult to implement and error prone. And while buffering will allow the peak data transfer rate to increase, the overall data transfer rate is ultimately limited by the rate at which data can be asynchronously transferred across logic circuits in different clock domains. Moreover, the synchronization of the handshake signals further limits the rate at which data can be transferred. Finally, a method of asynchronously transferring data not requiring the two-way handshake control signals would reduce the complexity of the control logic managing the flow of data between logic circuits having different clock domains.

Thus, a better method and apparatus for asynchronously transferring data from a first synchronous sequential logic circuit which derives its clock source from a first clock to a second synchronous sequential logic circuit which derives its clock source from a second clock, whereby metastability of the second synchronous sequential logic circuit is avoided, is needed.

SUMMARY AND OBJECTS OF THE INVENTION

The present invention is a method and apparatus for asynchronously transferring data between synchronous, sequential logic circuits in separate clock domains, whereby metastability is avoided. In an embodiment set forth in the detailed description below, the invention comprises a data path and a control path; a synchronizer coupled in series with the data path for synchronizing data signals asynchronously received from logic circuitry in another clock domain; another synchronizer coupled in series with the control path for synchronizing control signals also asynchronously transferred from logic circuitry in another clock domain; a register coupled in parallel to the data path for storing valid, stable data output from the synchronizer coupled to the data path; a multiplexor having 1) a data input coupled to the data path, 2) another data input coupled to the register, 3) a selector input coupled to the control path for selecting between receiving as input synchronized data signals or the contents of the register, and 4) an output for transmitting stable, valid data.

One object of the present invention is to increase the rate at which data may be asynchronously transmitted between synchronous logic circuits belonging to separate clock domains.

Another object of the present invention is to reduce the complexity of control logic required to manage the asynchronous transfer of data between synchronous logic circuits in different clock domains.

These and other aspects of the present invention will be described in greater detail with reference to the detailed description of the embodiments of the invention and the accompanying figures which follow below.

BRIEF DESCRIPTION OF THE DRAWINGS

The present invention is illustrated by way of example and not limitation in the following figures.

Figure 1:
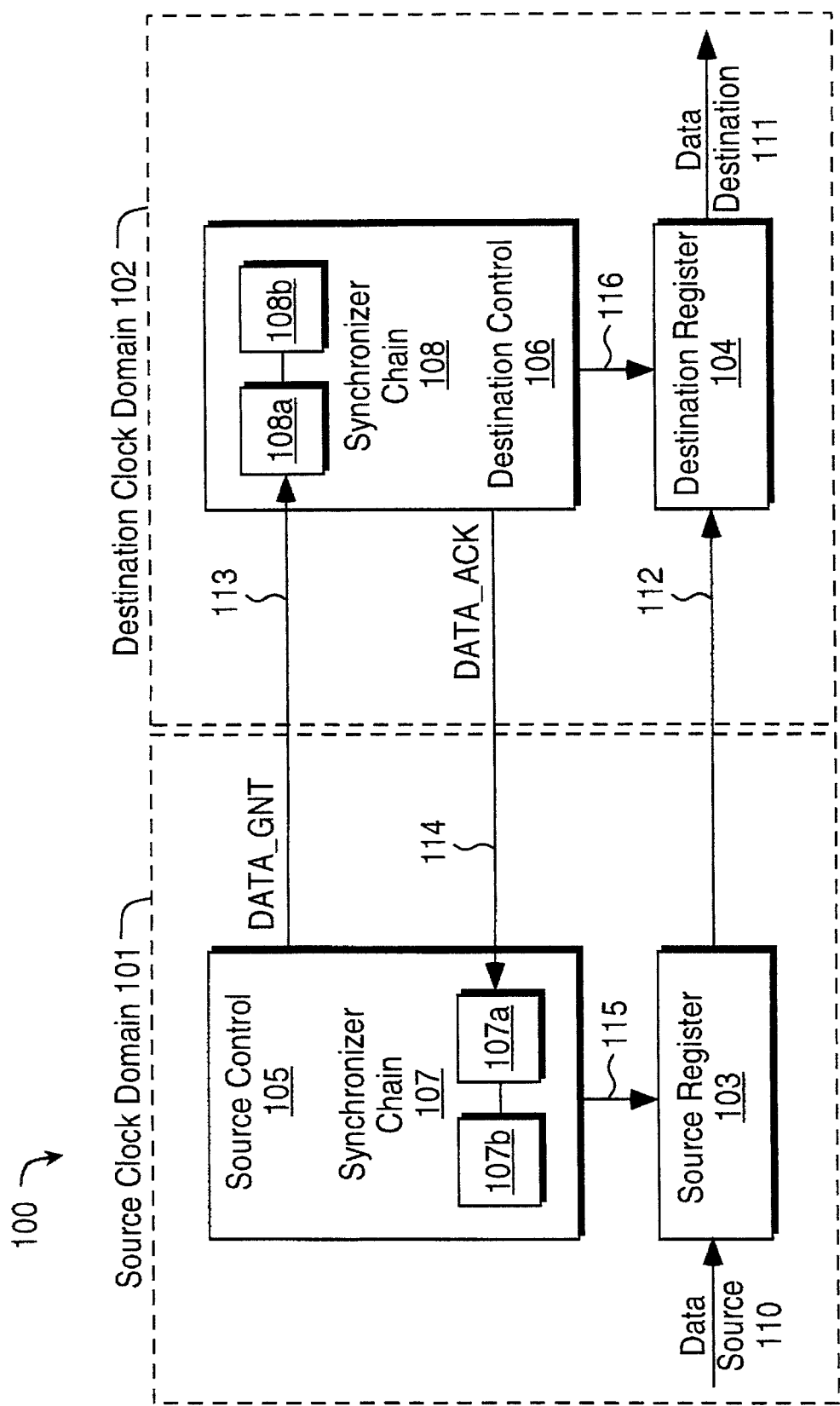
FIG. 1 is a block diagram of an embodiment of the prior art.
Figure 2:
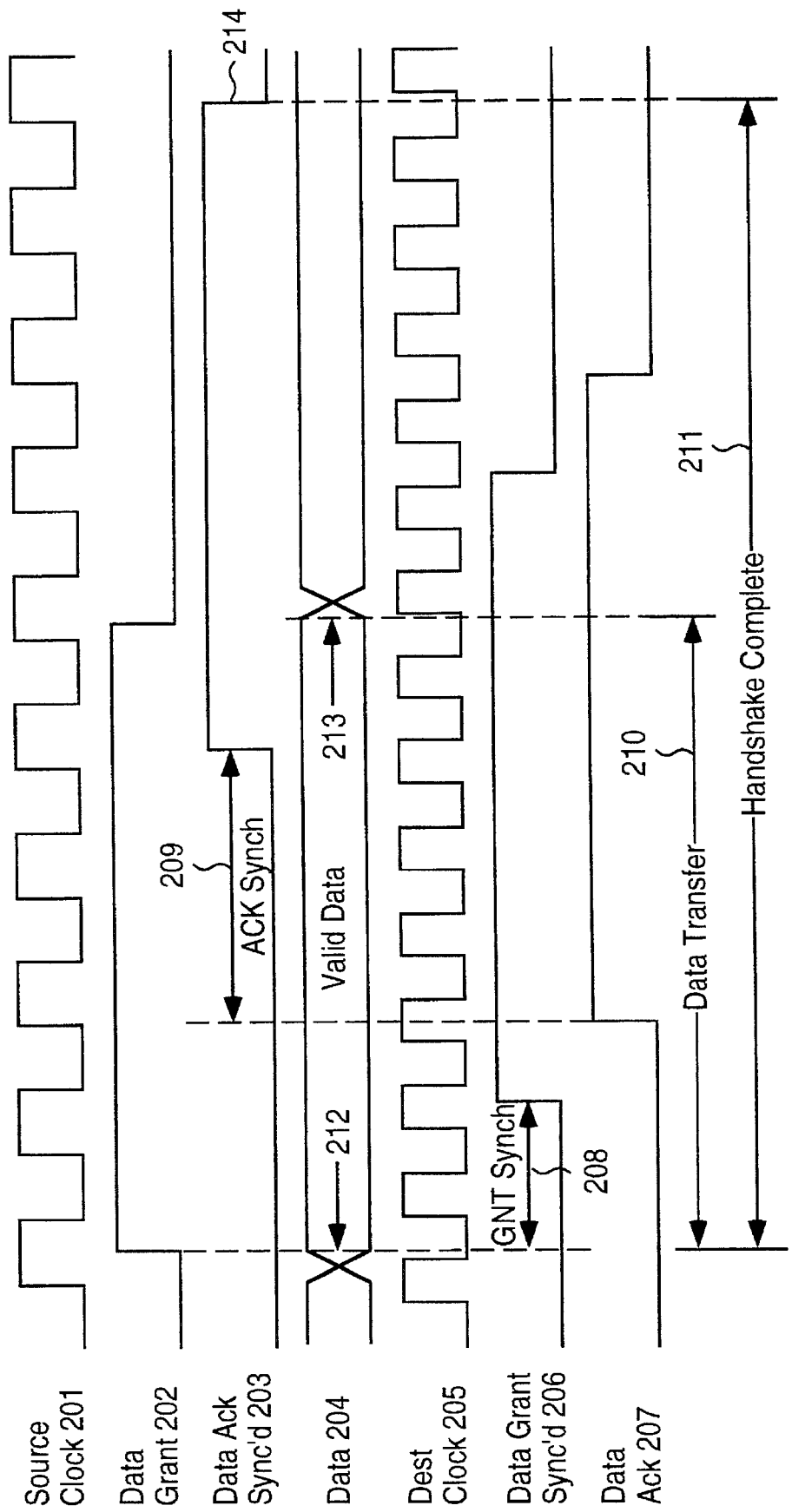
FIG. 2 is a timing diagram of the prior art shown in the block diagram of FIG. 1.

For ease of reference, it is noted that reference numerals in all of the accompanying drawings typically are in the form "drawing number" followed by two digits, nn. For example, reference numerals for FIG. 1 may be numbered 1nn; on FIG. 2, 2nn, and so on. In certain cases, a reference numeral may be introduced in one drawing to refer to a particular item and the same reference number may be used on other drawings to refer to the same item.

DETAILED DESCRIPTION OF THE EMBODIMENTS OF THE INVENTION

Described herein is a method and apparatus for asynchronously transferring data between synchronous sequential logic circuits having their own clock domain, whereby metastability is avoided. In the following description, numerous specific details are set forth in order to provide a thorough understanding of the present invention. It will be obvious, however, to one of ordinary skill in the art that the present invention may be practiced without these specific details. In other instances, well-known circuits, structures and techniques have not been shown in detail in order not to unnecessarily obscure the present invention.

Figure 3:
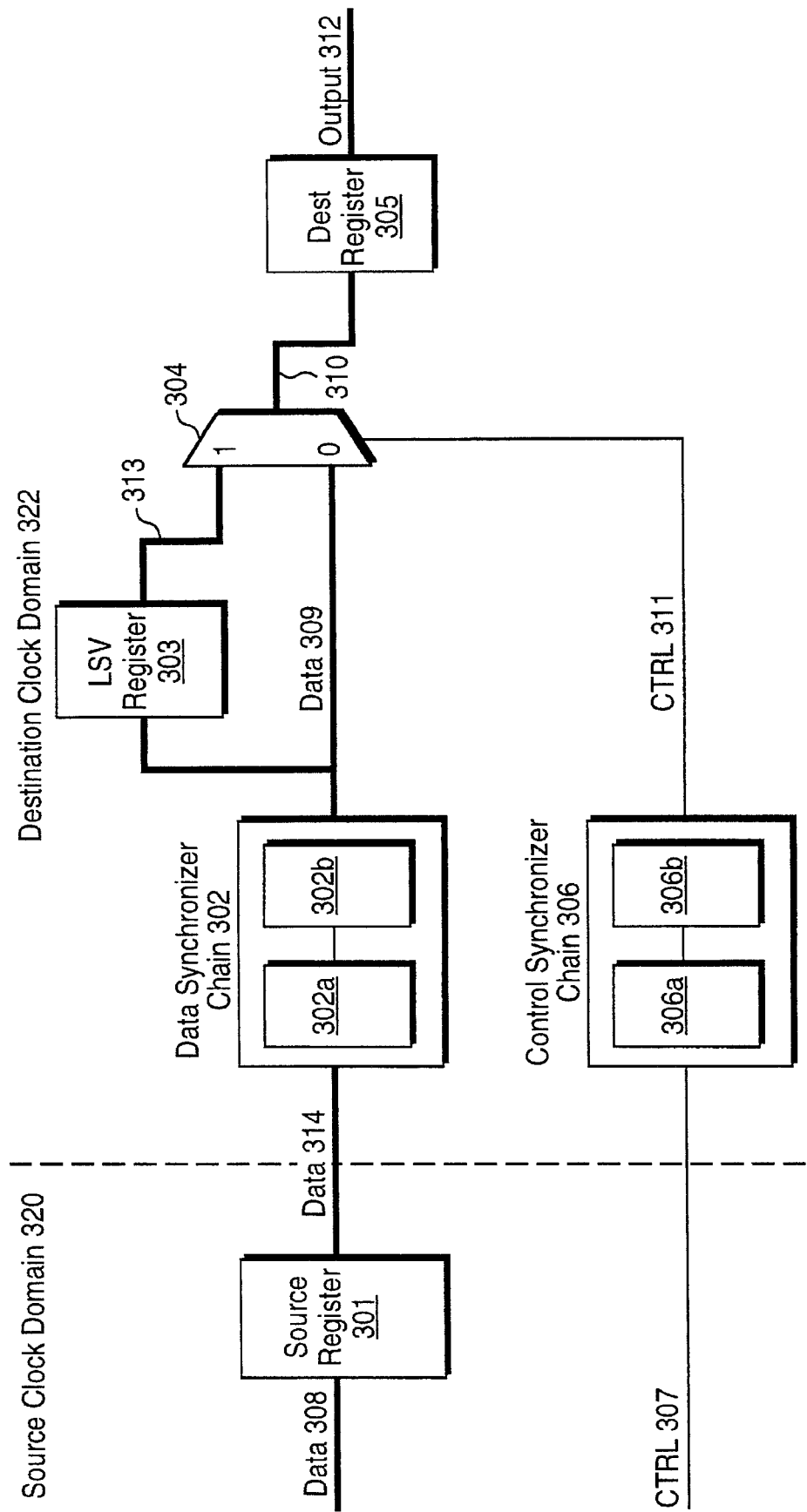
FIG. 3 is a block diagram of an embodiment of the present invention.

Referring to FIG. 3, a block diagram of an embodiment of the present invention is shown. The diagram shows two independent, separate clock domains, namely, source clock domain 320 and destination clock domain 322. Transfer of data over data bus 308 is asynchronous therebetween, in the direction of source clock domain to destination clock domain. The circuit in source clock domain 320 comprises a source register 301, wherein data is input and held prior to transfer to logic circuitry in destination clock domain 322 by way of data bus 308. Control signal CTRL 307 indicates when the state of source register 301 changes. This indication is utilized by multiplexor 304 in destination clock domain 322, which functions as a selector to determine if metastability may occur.

The circuit in destination clock domain 322 comprises a destination register 305, to which the contents of source register 301 are ultimately transferred. Destination register provides its output to other logic circuitry, either in the same clock domain or a separate clock domain as well, via data bus 312. Coupled to data bus 314 is data synchronizer chain 302, which comprises two flip-flops, 302a and 302b, the output of the former coupled to the input of the latter. The flip-flops of synchronizer 302 operate to reduce the probability of metastability in the data signal transferred from source register 301 via data bus 314 by synchronizing the signal to the clock signal of destination clock domain 322. Control synchronizer chain 302 asynchronously receives control signal CTRL 307 from source clock domain 320. It, like synchronizer 302 in this embodiment, comprises two flip-flops, 306a and 306b, coupled in the same manner as the flip-flops in synchronizer 302. The output of synchronizer 306 is coupled to the selector input of multiplexor 304 via control line CTRL 311. When CTRL 307 and, subsequently, CTRL 311, is asserted, multiplexor 304 accepts as input the contents of last stable value register 303, hereinafter referred to as LSV register 303, via data bus 313. When CTRL is not asserted, multiplexor 304 accepts as input the output from data synchronizer chain 302, that is, the synchronized data from source register 301, via data bus 309. The output of multiplexor 304, in turn, is coupled via data bus 310 to destination register 305.

The operation of the present invention as embodied in the circuit of FIG. 3 is as follows. Data is input into source register 301 via data bus 308. According to the clock signal of source clock domain 320, source register 301 asynchronously transfers its contents over data bus 314. Recall from the above discussion of the related art that in the circuit of FIG. 1, data was transferred across the clock domain under the guidance of control signals that performed a two-way handshake, in which data was required to be available in the first clock domain while a destination register was required to be available in the second domain. No such two-way handshake occurs or is required in the present invention, and thus, the concomitant synchronization delay that occurs in both directions is removed. Data is simply transferred asynchronously from source clock domain 320 to destination clock domain 322 without regard to the availability of a storage resource, namely, destination register 305. Synchronization delay occurs in one direction only, as the data transferred over data bus 314 and the control signal transferred over line CTRL 307 are synchronized according to the clock signal of destination clock domain 322. Circuitry in destination clock domain 322, namely, multiplexor 304, determines whether destination register 305 should receive the data so transferred on the basis of the probability of metastability as indicated by the output of control synchronizer chain 306, that is, if the signal output from control synchronizer chain 306 is asserted, the probability of metastability is likely, whereas if the output signal is deasserted, indicating no change in state of the contents of source register 301, the probability of metastability is unlikely.

If metastability is unlikely, the control signal transmitted over control line CTRL 311 is deasserted causing multiplexor 304 to select the synchronized data placed on data bus 309 as input. If however, metastability is likely, the synchronized control signal transmitted over control line CTRL 311 is asserted causing multiplexor 304 to select the last stable data forwarded from LSV register 303 over data bus 313 as input, thereby functionally delaying in time when the data exchange occurs with respect to destination register 305. The basic test is whether destination register 305 is going to accept the new state of source register 301 or wait and use the old state of source register 301, currently maintained in LSV register 303, until such time as the likelihood of metastability has passed, as indicated by the synchronized control signal transmitted over control line CTRL 311. Thus, using this protocol, not all data values presented in source clock domain 320 are received by destination register 305 in destination clock domain 322. While the circuit of FIG. 3 is not a data pipe, it does ensure that when data it utilized, that is, transmitted to destination clock domain 322, it is the most recent valid logic value available.

It is noted that it is necessary to maintain in source clock domain 320 the relative timing relationship between the control signal transmitted over control line CTRL 307 and data signal transmitted over data bus 314, if the control signal is to accurately time the possibility of metastability in the data signal. For the same reason, the depth of synchronizer chains 302 and 306 in destination clock domain 322 should be equivalent as well. If the depths of the synchronizer chains were different, then the control signal would be unable to accurately represent the stability of the data signal, due to significant variance in propagation delay of each subsequently synchronized signal with respect to each other in reaching multiplexor 304.

Last stable value (LSV) register 303 is used to provide a data value if it is determined that the synchronized data value may be metastable. The decision to load either the output of synchronizer chain 302 or LSV register 303 is made by monitoring the synchronized control signal transmitted over control line 311. If the synchronized control signal is asserted, the contents of LSV register 303 is transmitted over data bus 313, through multiplexor 304 and data bus 310 to destination register 305. If the synchronized control signal is deasserted, the output of data synchronizer chain 302 is both loaded into LSV register 303 and destination register 305. Alternatively, LSV register 303 (and as a result, multiplexor 304) can be eliminated if destination register 305 can wait for a new value. In that scenario, destination register 305 would simply continue to monitor the output of control synchronizer chain 306, and only accept a new synchronized data value if the signal output by control synchronizer chain 306 was deasserted.

Figure 4:
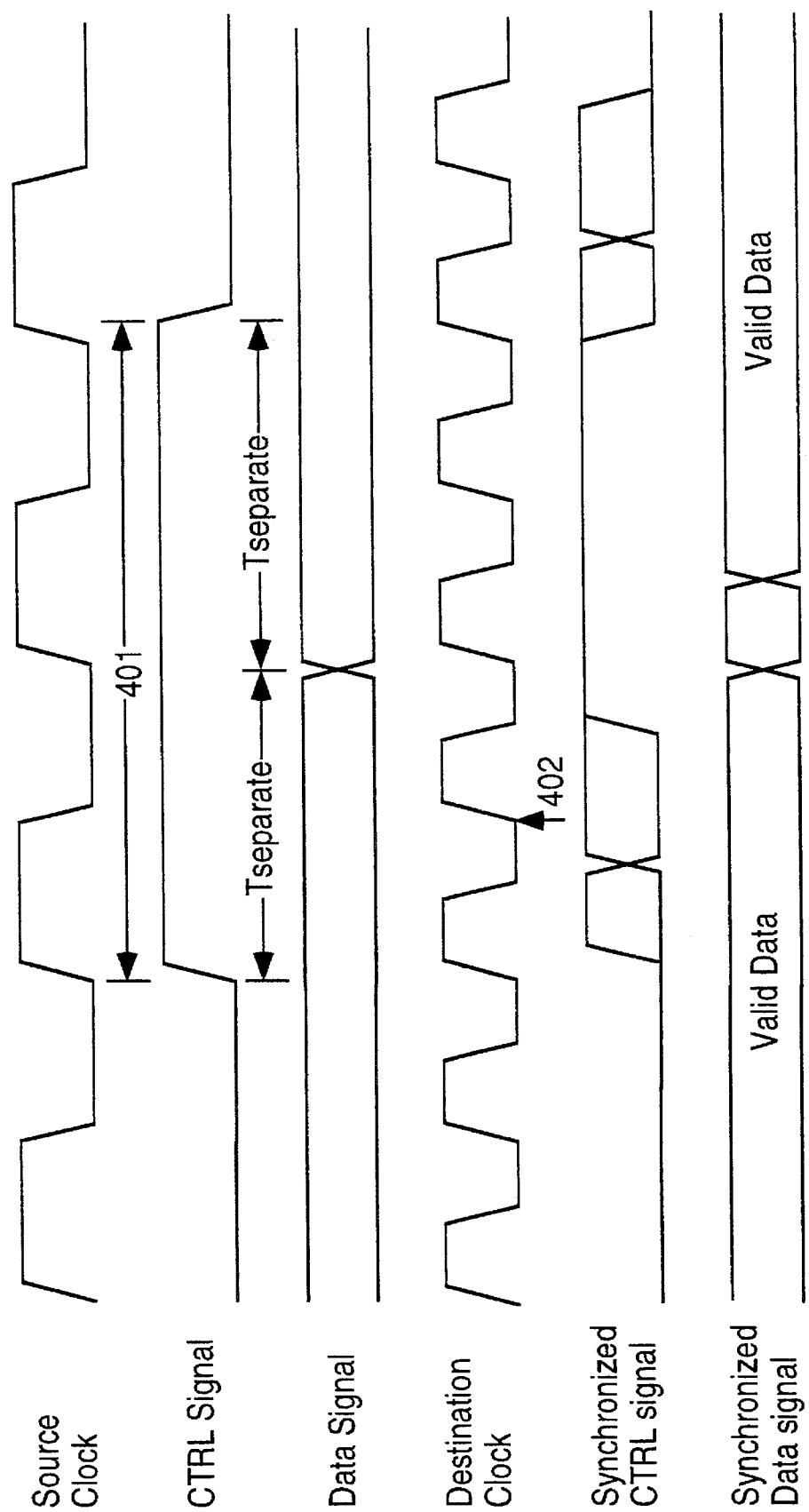
FIG. 4 is a timing diagram of the operation of an embodiment of the present invention shown in the block diagram of FIG. 3.

Referring to FIG. 4, the timing relationship between the control signal and data signal in source clock domain 320 should be such that the control signal transmitted over CTRL 307 is active high when the contents of source register 301, and thus, the data signal transmitted over data bus 314, change state. Moreover, there should be adequate elapsed time between changes in the state of the control signal and the change in state of the data signal transmitted over data bus 314 such that the logic circuitry in destination clock domain 322 will not receive both transitions during the same clock edge. That is, the time separating ($T_{separate}$) a change in state of the control signal transmitted over CTRL 307 and a change in state of the data signal transmitted over data bus 314 should be greater than the sum of the setup ($T_{setup}$) and hold ($T_{hold}$) time for the first stage (flip-flop) in synchronization chains 302 and 306:

$$T_{separate} = (T_{setup} + T_{hold})_{destination\_clock\_domain}$$

Thus, the period of time during which the control signal should remain active high is two times $T_{separate}$, shown as time period 401 in FIG. 4, thereby providing a window during which the data signal may change state.

The timing relationship between the control signal and the data signal as described above provides for separation by at least one clock cycle of a change in state of either signal with respect to the other signal. For example, with reference to FIG. 4, the synchronized control signal may be either high or low at destination clock time 402. If the synchronized control signal is low, the data from data synchronizer chain 302 is accepted by destination register 305. If, however, the synchronized control signal is high, the data from LSV register 303 is accepted by destination register 305. Both outcomes are acceptable. If the data signal is changing, then the synchronized control signal transmitted over control line 311 is active high, thus the contents of LSV register 303 are transmitted over data bus 310.

Thus, a method and apparatus for asynchronously transferring data between synchronous circuits having their own clock domain, whereby metastability is avoided, is described.

I claim:

1. An apparatus coupled in communication with a first logic circuit and a second logic circuit asynchronously transmitting data therebetween, said first and said second logic circuit each deriving a clock signal from a separate clock source, said apparatus comprising:

a data path;

a control path;

a data synchronizer coupled in communication with said data path for synchronizing a data signal transferred from said first logic circuit to said second logic circuit;

a control synchronizer coupled in communication with said control path for synchronizing a control signal transferred from said first logic circuit to said second logic circuit;

a memory element coupled to said data path for storing a stable data signal output from said data synchronizer; and, a selector having a first data input coupled to said data path, a second data input coupled to said memory element, and a selector input coupled to said control path, for selecting as output said data signal or said stable data signal stored in said memory element on the basis of said control signal.

2. An apparatus for transferring data between sequential logic circuits in separate clock domains, comprising:

a data path;

a control path;

a first synchronizer coupled to said data path synchronizing a data signal transferred from a logic circuit in a first clock domain;

a second synchronizer coupled to said control path synchronizing a control signal transferred from said logic circuit in said first clock domain;

a memory element coupled to said first synchronizer for storing a stable data signal output from said first synchronizer; and, a selector selecting as output said data signal synchronized by said first synchronizer or said stable data signal stored in said memory element on the basis of said control signal synchronized by said second synchronizer, comprising:

a first data input coupled to said first synchronizer for receiving said data signal synchronized by said first synchronizer;

a second data input coupled to said memory element for receiving said stable data signal stored in said memory element;

a control input coupled to said second synchronizer receiving said control signal synchronized by said second synchronizer; and, an output for transmitting said data signal synchronized by said first synchronizer or said stable value stored in said memory element.

3. An apparatus providing stability of a data signal asynchronously transmitted between a first synchronous logic circuit and a second synchronous logic circuit, said synchronous logic circuits each deriving a clock signal from a separate clock source, said apparatus comprising:

a data bus coupled in communication between said first synchronous logic circuit and said second synchronous logic circuit;

a source register coupled to said data bus transmitting said data signal asynchronously to said second synchronous logic circuit;

a data synchronizer coupled to said data bus receiving and synchronizing said data signal asynchronously transmitted from said source register;

a control bus coupled in communication between said first synchronous logic circuit and said second synchronous logic circuit over which said first synchronous logic circuit asynchronously transmits a control signal;

a control synchronizer coupled to said control bus receiving and synchronizing said control signal asynchronously transmitted;

a destination register coupled to said data synchronizer and said control synchronizer forwarding said data signal synchronized by said data synchronizer on the basis of said control signal synchronized by said control synchronizer.

4. An apparatus providing stability of a data signal asynchronously transmitted between a first synchronous logic circuit and a second synchronous logic circuit, said synchronous logic circuits each deriving a clock signal from a separate clock source, said apparatus comprising:

a data bus coupled in communication between said first synchronous logic circuit and said second synchronous logic circuit;

a source register coupled to said data bus storing and transmitting said data signal asynchronously to said second synchronous logic circuit over said data bus;

a data synchronizer coupled to said data bus receiving and synchronizing said data signal asynchronously transmitted from said source register;

a last stable value register coupled to said data synchronizer receiving and storing a stable synchronized data signal from said data synchronizer;

a control bus coupled in communication between said first synchronous logic circuit and said second synchronous logic circuit over which said first synchronous logic circuit asynchronously transmits a control signal;

a control synchronizer coupled to said control bus receiving and synchronizing said control signal asynchronously transmitted;

a selector having a selector input coupled to said control synchronizer and data inputs coupled to said data synchronizer and said last stable value register for selecting as output said stable synchronized data signal from said last stable value register or a synchronized data signal from said data synchronizer on the basis of said control signal synchronized by said control synchronizer; and, a destination register coupled to said selector for storing and forwarding said output of said selector.

5. The apparatus of claim 4, wherein said data synchronizer comprises a plurality of flip-flops coupled in sequence.

6. The apparatus of claim 4, wherein said control synchronizer comprises a plurality of flip-flops coupled in sequence.

7. A method of asynchronously transmitting a data signal from a first logic circuit to a second logic circuit, said first and second logic circuits each deriving a clock signal from a separate clock source, comprising the steps of:

(a) asynchronously transmitting a data signal from said first logic circuit to said second logic circuit;

(b) asynchronously transmitting a control signal from said first logic circuit to said second logic circuit;

(c) maintaining an active state of said control signal for a period of time during which said data signal changes state;

(d) synchronizing said data signal in accordance with said clock signal of said second logic circuit;

(e) synchronizing said control signal in accordance with said clock signal of said second logic circuit;

(f) if said control signal synchronized by said control synchronizer is not active:
(i) saving said data signal synchronized by said data synchronizer in step (d) above to a memory element; and,
(ii) transmitting said data signal synchronized by said data synchronizer in step (d) above; and, (g) if said control signal synchronized by said control synchronizer is active, transmitting said data signal saved in said memory element in step (f)(i) above.

8. A method of asynchronously transmitting a data signal from a first logic circuit to a second logic circuit, said first and second logic circuits each deriving a clock signal from a separate clock source, comprising the steps of:

(a) asynchronously transmitting a data signal from said first logic circuit to said second logic circuit;

(b) asynchronously transmitting a control signal from said first logic circuit to said second logic circuit;

(c) maintaining an active state of said control signal for a period of time during which said data signal changes state;

(d) synchronizing said data signal in accordance with said clock signal of said second logic circuit;

(e) synchronizing said control signal in accordance with said clock signal of said second logic circuit;

(f) if said control signal synchronized by said control synchronizer is not in said active state, transmitting said data signal synchronized by said data synchronizer in step (d) above; and, (g) if said control signal synchronized by said control synchronizer is in said active state, withholding transmission of said data signal synchronized by said data synchronizer in step (d) above.

\* \* \* \* \*